Feb. 19, 1963 J. P. SIKORA 3,077,826
OVEN
Filed July 20, 1959
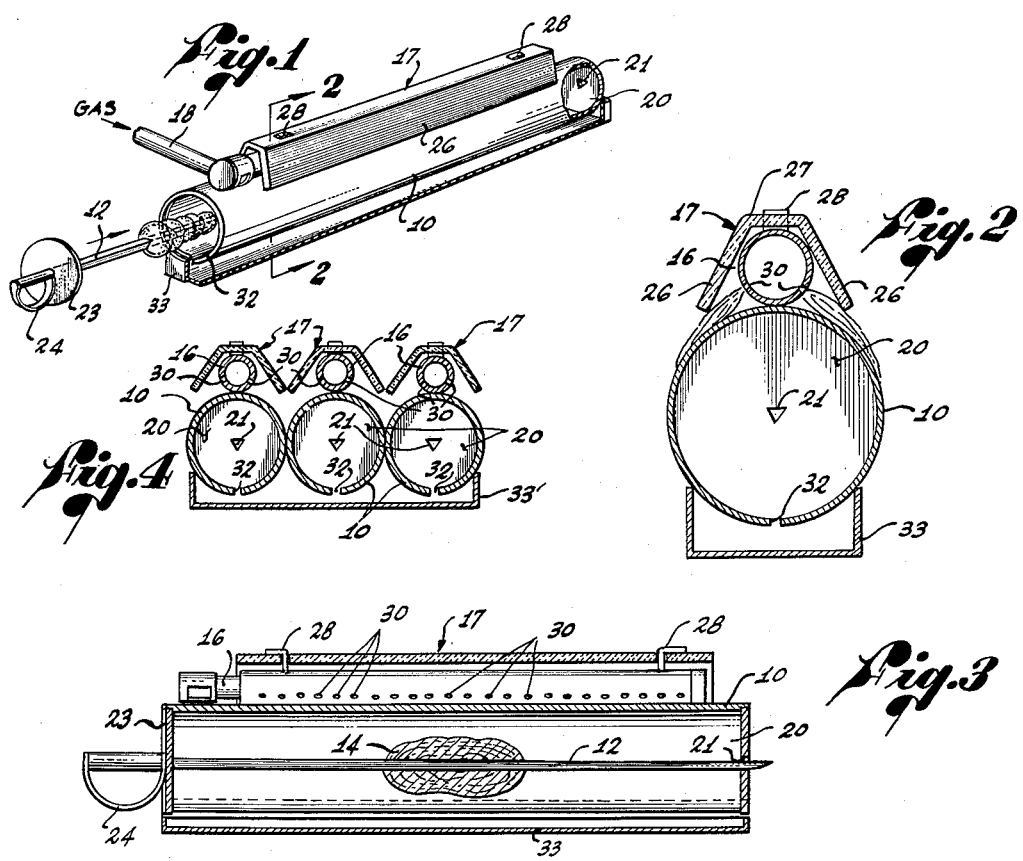
INVENTOR.
JOHN P. SIKORA
BY Fulwider Mattingly & Huntley
Attorneys United States Patent Office 3,077,826
Patented Feb. 19, 1963

3,077,826
OVEN
John P. Sikora, 729 Ramage St., Los Angeles, Calif.
Filed July 20, 1959, Ser. No. 828,275
2 Claims. (Cl. 99—421)

This invention relates to cooking apparatus, and more particularly to an improved oven structure for cooking meats and the like quickly and evenly.

As is well known, conventional ovens are ineffective for cooking meats evenly throughout. In such ovens, which are generally rectilinear in cross section, the source of heat is normally located at the bottom. For example, a gas burner is conventionally located beneath the floor of the oven, and the oven is provided adjacent its upper surface with an outlet opening for heat and fumes. When food is cooked in such an oven, as in pans or on racks, it is cooked unevenly; the portion of the food nearest the heat source is that which is cooked first, and the uppermost portion is the last portion to be cooked to the desired extent.

In order to get around the difficulties of the stationary oven and heat sources, there has been developed devices for supporting food stuffs, i.e., meat in particular, on a rotatable "spit." The spit is journaled at its ends in the oven housing, and a connection is made at one end to a motor shaft which is rotated to effect turning of the meat continuously. In this manner, all portions of the meat are exposed to the source of heat, and the meat is cooked evenly at all points.

There are many disadvantages to the use of such rotisseries. One such disadvantage is the employment of rotating parts, which frequently have to be cleaned to be kept in good working order. Such maintenance problems are especially aggravated by the fact that grease accumulates in the bearings in which the spit is mounted, thereby making the spit more difficult to turn. After a sufficient length of time, the spit may be so difficult to turn that the motor will become stalled, and may burn out.

In addition to such maintenance problems, the rotisserie is not suitable for cooking large quantities of meats, particularly in large restaurants where meat dishes of various kinds must be prepared and cooked in great numbers during the rush periods. One reason, of course, is that after a meat item is cooked on a spit, it is necessary for the chef to remove it from the oven, and then reach into the oven with another meat item and position it on the spit. These operations are made all the more difficult because of the intense heat within the oven. In fact, the temperature needed for cooking some meats is too great for a person to stand, and consequently the oven must be allowed to cool down somewhat before placing such meats on the spit therein. Accordingly, undesirable delays are encountered in taking care of a constant flow of orders from patrons in the dining area during rush hours.

In some of the better restaurants, there are so-called "sword" dishes, in which meats (e.g., poultry, fish, and some pork and beef dishes) are held on a sword element within the oven and which are delivered to the customer on the sword immediately after being removed from the oven. The sword cannot readily be turned in the manner of the spit, and therefor it is necessary for the chef to periodically turn it so that the meat item is cooked evenly at all points to the desired degree. Of course, the degree of cooking of such meat items is almost entirely dependent upon the particular chef's experience and judgment in cooking them.

As is well known, meat items constitute the main course of the dinners of most patrons. Normally the other courses, e.g., vegetable dishes and the like, are already prepared, so that preparation of the meat items constitutes the main delay in getting the patrons served. In the restaurant business, it is of course desirable to serve as many patrons as possible, because most restaurants operate on a relatively low margin of profit per meal. Accordingly, the more rapidly the meat dishes can be prepared, the greater the number of patrons that can be served.

It is also well known that outdoor barbecues suffer many of the same disadvantages as the ovens above discussed. Where meat is placed on a horizontal grill, it is of course almost impossible to cook the item evenly on all sides. The reason for this is that the charcoal in that portion of the charcoal bed over which the meat is placed does not radiate heat evenly, i.e., at the same temperatures to all parts of the meat. In an attempt to cook the meat evenly at all points, there are provided rotary spit attachments for barbecues. However, such attachments are effective only to permit the meat to be cooked a little better than with the horizonal grill arrangement; as with that type, there is still the problem of unevenness of heat radiation from the charcoal bed. Another objection to outdoor barbecues, of course, is the creation of smoke and the consequent eye irritation.

It is an object of this invention to provide an improved oven structure which permits food to be cooked more evenly and quickly than is possible with prior art ovens and barbecues.

It is another object of this invention to provide a unique oven structure which permits food to be cooked evenly and quickly at all points without the need of rotary devices such as employed in rotisseries and the like.

A further object of this invention is to provide an oven structure employing a cylindrical housing, in which the lateral surface of the housing is heated to effect the radiation of heat to all points of the interior with substantially the same intensity.

A still further object of this invention is to provide an oven structure employing a stationary spit for supporting meats to be cooked, wherein a tubular oven housing formed of heat conducting material surrounds the spit and is adapted to direct heat to all points of the interior of the housing with the substantially same intensity.

The above and other objects and advantages of this invention will become apparent from the following description taken in conjunction with the accompanying drawing in which:

FIGURE 1 is a perspective view of one embodiment of my invention, showing a cylindrical oven housing adapted to have the lateral surface thereof heated from a gas burner;

FIGURE 2 is a sectional view taken along the line 2—2 of FIGURE 1, showing the reflector configuration for directing the heat from the burner against the lateral surface of the housing;

FIGURE 3 is a longitudinal sectional view of the oven structure of FIGURE 1, showing the sword-like rod supported at the ends of the housing for suspending a meat item therein; and FIGURE 4 is an end elevation view of a plurality of the oven structures of FIGURES 1-3, showing them arranged in abutting relation to prevent flame from passing to the grease slits thereof.

Referring to FIGURES 1-3, there is shown a cylindrical housing 10 and a sword-like element 12 which is to be received in the housing 10, the sword 12 being provided to hold an item of food, generally indicated at 14 in FIGURE 3, suspended within the housing 10. The housing 10 is arranged, as illustrated in FIGURE 3, to be held horizontally.

Disposed above the housing 10 is an elongated burner element 16, over which is an elongated heat reflecting element 17. The burner 16 is supplied with gas through a gas line, as indicated at 18 in FIGURE 1, which when ignited establishes a flame along the length thereof. The heat from the burner 16 is directed by the heat reflector 17 against the lateral surface of the housing 10. The housing is formed of a metal characterized by excellent heat conduction; due to the cylindrical form of housing the entire lateral surface thereof is heated quickly and evenly, thereby to cause heat to be directed inwardly from all points toward the center of the housing.

By thus heating the lateral surface of the housing, all points along the housing are heated to substantially the same temperature. And due to the cylindrical construction, the entire interior of the housing 10 is at substantially the same temperature. Accordingly, the meat 14 is cooked evenly to the extent desired; the extent desired is determined by the time the meat is held in the housing at the temperature of the interior thereof. When the meat has been cooked to the desired extent, the sword 12 is removed from the housing, carrying the meat thereon.

To further describe the structure of FIGURES 1–3, the housing 10 is provided with a closed end 20 having an opening 21 therein for receiving the end of the sword 12 (see FIGURE 3). Preferably, the opening 21 is sufficiently large so that no difficulty is presented to the chef in locating the end of the sword 12 therein. However, to insure that the end of the sword 12 extending through the opening 21 is properly centered within the housing while the meat is being cooked, I prefer to employ an opening having sides sloping upwardly from the center of the closed end 20; in this manner, the weight of the sword 12, and of the meat thereon, insures that the end of the sword extending through the opening 21 will move downwardly to rest at the bottom of the opening.

The opposite end of the housing 10 is closed by a plate 23 which surrounds the sword 12 and is secured thereto adjacent its handle, shown at 24. The position of the plate 23 is such that when the opposite end of the sword extends through the opening 21 of the closed end 20, the plate 23 closes the adjacent end of the housing 10. As will be evident, the closing of both ends of the housing while meat is being cooked therein aids in preventing heat from escaping and thereby lowering or varying the temperature of the interior thereof.

It will be apparent that the reflecting element 17 may have a variety of shapes, so long as it is effective in directing heat against the lateral surface of the housing 10. However, and as shown in FIGURES 1–3, one form I prefer for the reflecting elements 17 is that of the channel-shaped element having legs 25, 26 which diverge from the web portion 27 thereof. The web portion 27 is secured to the top of the burner element 16, as by angle elements 28, which are secured at one end to the top of the burner element 16, and extend through the web elements 27, where they are bent over onto the upper surface thereof to secure the reflecting element in place.

The legs 25, 26 of the reflecting element 17 extend past the burner elements 16, with the lower edges of the legs being in close proximity to the lateral surface of the housing 10. With this arrangement, flame emanating from the burner elements 16 is directed along the leg portions 25, 26 against the lateral surface of the burner element 10 so that it will be heated throughout in the manner previously described.

To aid in directing the heat against the lateral surface of the housing, I provide the burner element 16 with a plurality of spaced openings 30 (see FIGURES 2 and 3) which are directed at an angle below the horizontal, so that flame emanating from the burner element will strike the inner surfaces of the legs 25, 26. As indicated in FIGURE 2, this arrangement causes the flame and heat to be deflected so as to strike the upper portion of the lateral surface of the housing 10.

My oven element also has a grease escape provision. As shown, the housing 10 is provided with an elongated slit 32 along its lowermost portion, and a grease pan 33 (see FIGURE 3) as disposed immediately below the slit 32. Thus, grease drippings from the meat cooking on the sword 12 are allowed to pass out of the housing through the slit 32 and into the grease pan 33.

The shape of the housing 10 also aids in causing grease to be passed out of the housing through the slit 32. As will be evident, any grease that spatters against any portion of the interior wall of the housing will be caused to flow downwardly, where it will pass through the slit 32 and to the grease pan 33.

While various materials may be used for the different parts of the oven structure, I prefer, as previously indicated, that the housing 10 be formed of a metal having very good heat conduction qualities, so that the entire lateral surface thereof will be quickly heated from the burner 16. Also, the plate 23 secured to the sword 12 preferably is of insulating material, so that one's hand in gripping the handle 24 will not be exposed to the intense heat in the housing.

With the above-described oven structure, I have found that it is possible to heat the oven 10 extremely fast, merely by establishing a very strong and intense flame from the burner element 16. The intensity of the flame determines the interior temperature of the housing 10. With this arrangement, I am able to cook food on the sword 12 in only a fraction of the time heretofore needed with the conventional ovens and/or rotisseries, e.g., shishkabob can be evenly cooked and served in five minutes, in sharp contrast to the twenty minutes or more required with conventional ovens.

If the flame from the burner elements 16 is made sufficiently intense, it is possible for it to travel around the lateral surface of the housing 10 so as to substantially envelop it. This would bring the flame in the vicinity of the slit 32, so that grease passing therethrough might be set afire. To prevent this, I arrange the grease trap pan 33 so that the sides thereof (see FIGURE 2) are in abutment with the lateral surface of the housing, thereby to form a barrier which prevents the flame from passing to the slit 32.

FIGURE 4 illustrates how I arrange a plurality of the ovens of the type described above, as for use in the kitchens of large restaurants wherein it is required to supply cooked items in quantity during rush periods. Referring to FIGURE 4, there is shown a number of housings 10 placed side by side in abutting relation. The grease pan 33' is provided which has upwardly extending sides abutting the lateral surfaces of the housings at the ends of the row. In this manner, the flame from the burner elements 16 cannot pass around the housings 10 intermediate those at the ends of the row, due to the fact that the intermediate housings are in abutment, and the flame cannot pass around the lateral surfaces of the end housings to reach the slits 32. If desired, the abutting housings may be welded together along their length.

With the ovens arranged in a row as indicated at FIGURE 4, it will be seen that I provide a composite oven structure having a plurality of individual openings for selectively heating foods held therein. Further, in this type of oven structure, the interiors of the individual housings 10 can be heated selectively, i.e., they can be at different temperatures, depending upon the foods to be cooked therein. In one large restaurant, a row of eight such individual ovens, each cooking one shishkabob at a time, has been found satisfactory for serving sword dishes to about one hundred customers in the space of an hour, whereas eight conventional ovens similarly used are effective for serving such dishes to only twenty-five customers or less.

While I have described various embodiments of my invention, it will be apparent that various modifications may be made therein without departing from the spirit

I claim:

1. A gas oven construction comprising: an elongated, horizontal tubular element of heat conductive material, said element having a closed end and an open end, said closed end having a central opening therein, said central opening having sides sloping upwardly from the center of said closed end, said element having a slit in its lateral surface intermediate said ends, said slit being in the lowermost portion of said element, an elongated gas burner device parallel to the axis of said element, said device extending along the outer surface of said element, said device having outlets arranged to direct flame generally toward the surface of said element; an elongated heat reflecting element overlying said device, whereby to keep the flame and heat directed toward the lateral surface of said tubular element; a removable closure plate for said open end of the tubular element; a rod extending through the center of said plate, said plate being secured to said rod, said rod constituting a sword-like element which on one side of said plate has a handle portion, said rod on the other side of said plate extending the length of said tubular element so that its opposite end extends through the opening in the closed end of said tubular element; and a pan situated below said slit in said tubular element, said pan having a bottom wall and side walls, said side walls of said pan abutting the lateral surface of said tubular element to shield said slit from flame.

2. A gas oven construction comprising: an elongated, horizontal tubular element of heat conductive material, said element having a closed end and an open end, said closed end having a central opening therein; said central opening having sides sloping upwardly from the center of said closed end; said element having a slit in its lateral surface intermediate said ends, said slit being in the lowermost portion of said element, an elongated gas burner device parallel to the axis of said element, said device extending along the outer surface of said element, said device being supported on said element along at the uppermost portion thereof, said device having outlets arranged to direct flame generally toward the surface of said element; an elongated heat reflecting element overlying said device and being supported thereon, said reflecting element having side portions extending below the flame outlets, whereby to keep the flame and heat directed toward the lateral surface of said tubular element; a removable closure plate for said open end of the tubular element; a rod extending through the center of said plate, said plate being secured to said rod, said rod constituting a sword-like element which on one side of said plate has a handle portion, said rod on the other side of said plate extending the length of said tubular element so that its opposite end extends through the opening in the closed end of said tubular element; and an elongated pan below said slit for catching grease, said pan having sides which abut the lateral surface of said tubular element on opposite sides of said slit, whereby to prevent flame from said burner device from reaching said slit.

References Cited in the file of this patent

UNITED STATES PATENTS

| | | |
|---|---|---|
| 1,887,219 | Stranszky | Nov. 8, 1932 |
| 2,076,091 | O'Neill | Apr. 6, 1937 |
| 2,578,227 | Chambers | Dec. 11, 1951 |